United States Patent [19]
Struthers

[11] Patent Number: 5,407,757
[45] Date of Patent: Apr. 18, 1995

[54] CERAMIC AEROGEL FUEL CELL

[76] Inventor: Ralph C. Struthers, 39503 Calle El Fuente, Saugus, Calif. 91350

[21] Appl. No.: 275,505

[22] Filed: Jul. 15, 1994

[51] Int. Cl.⁶ .............................................. H01M 8/00
[52] U.S. Cl. ...................................... 429/26; 429/34; 429/40; 429/46
[58] Field of Search ........................ 429/44, 46, 26, 42, 429/101, 12, 40, 41, 45, 34; 502/100, 102, 103

[56]    References Cited
U.S. PATENT DOCUMENTS

| | | | |
|---|---|---|---|
| 3,719,528 | 3/1973 | Grasselli et al. | 429/46 |
| 3,960,601 | 6/1976 | Schulz | 429/212 |
| 4,659,559 | 4/1987 | Struthers | 429/46 |
| 4,997,804 | 3/1991 | Pekala | 502/418 |

Primary Examiner—Anthony Skapars
Attorney, Agent, or Firm—Georges A. Maxwell

[57]    ABSTRACT

An electrochemical fuel cell system comprising a fuel supply; an oxidant supply; a refrigerant supply; a fuel cell including a catalytic ceramic perovskite superconductor anode aerogel electrode fed with fuel from said fuel supply, a catalytic ceramic perovskite superconductor aerogel cathode electrode fed with oxidant from said oxidant supply, an electrolyte laded separator between the anode and cathode; and, an external circuit connected with and between the anode and cathode electrodes.

9 Claims, 3 Drawing Sheets

Fig. 2.

A
ALCOSOL
DISSOLVING COLLOIDAL
PEROVSKITE CERAMIC SUPERCONDUCTOR
SUBSTANCES IN ALCOHOL TO MAKE ALCOSOL

B
ALCOGEL PARTS
CURING ALCOSOL IN MOLDS TO MAKE
ALCOGEL ELECTRODE PARTS

C
CARBON DIOXIDE GEL PARTS
SUBSTITUTE ALCOHOL IN THE GEL PARTS
WITH LIQUID CARBON DIOXIDE

D
DRIED AEROGEL PARTS
SUPERCRITICAL DRYING CARBON DIOXIDE GEL PARTS
TO REMOVE CARBON DIOXIDE

E
CERAMIC AEROGEL PARTS
KILN FIRING AEROGEL PARTS IN AIR ATMOSPHERE

F
SUPERCONDUCTOR CERAMIC AEROGEL
ANNEALED THE CERAMIC AEROGEL PARTS IN OXYGEN ATMOSPHERE

G
TEST ELECTRODE PARTS FOR SUPERCONDUCTIVITY
COOL ELECTRODE PARTS WITH LIQUID NITROGEN AND
MEASURE RESISTANCE, MEISSNER EFFECT,
CURRENT DENSITY AND JOSEPHSON EFFECT

Fig. 3.

H
ALCOSOL
DISSOLVING COLLOIDAL
DIELECTRIC CERAMIC OXIDE
SUBSTANCES IN ALCOHOL TO MAKE ALCOSOL

I
ALCOGEL PARTS
CURING ALCOSOL IN MOLDS TO MAKE
ALCOGEL SEPARATOR PARTS

J
CARBON DIOXIDE GEL PARTS
SUBSTITUTE ALCOHOL IN THE GEL PARTS
WITH LIQUID CARBON DIOXIDE

K
DRIED AEROGEL PARTS
SUPERCRITICAL DRYING CARBON DIOXIDE GEL PARTS
TO REMOVE CARBON DIOXIDE

L
CERAMIC AEROGEL
KILN FIRING IN AIR ATMOSPHERE

M
DIELECTRIC CERAMIC AEROGEL
IS FILLED WITH LIQUID ELECTROLYTE

CERAMIC AEROGEL FUEL CELL

BACKGROUND OF THE INVENTION

This invention has to do with electrochemical fuel cells and is particularly concerned with a novel ceramic aerogel fuel cell.

Fuel cells in which a gas is used as an anode fuel and a gas is used as a cathode oxidant are old in the art. Such fuel cells are generically called fuel cells and operate to convert the chemical energy of the fuel (gas) into electric energy by galvanic action.

The world's automobile manufacturers are actively seeking to develop electric vehicles in order to meet state, federal and global air pollution goals and to relieve our dependence on and use of fossil fuels.

As a result of the above, there is an ongoing search for advanced batteries and/or fuel cells for the purpose of generating electric power for electric vehicles, which are inexpensive and that will effect propelling electric vehicles several hundred miles per fueling or charge.

To the above end, the present invention provides a novel fuel cell that is characterized by producing oxygenated catalytic perovskite ceramic superconductor aerogel anode and cathode electrodes, of three-dimensional reticulate form; and, an electrolyte-filled micro porous dielectric ceramic aerogel separator between the electrodes.

PRIOR ART

The making those useful, structurally stable, micro porous materials called aerogels is old in the art. Aerogels were invented in the 1930s by Samuel S. Kistler. Their manufacture is described in U.S. Pat. No. 2,093,454, issued to Samuel S. Kistler on Sep. 21, 1937 and entitled, "Method of producing Aerogels."

The manufacture of a fuel cell aerogel catalyzed carbon electrode is described in co-pending application of Ralph C. Struthers Ser. No. 08/113,067 filed on Aug. 30, 1994, and entitled, "Hydrocarbon (hydrogen)/Air Aerogel Catalyzed Carbon Electrode Fuel Cell System."

The manufacture of a battery hydride metal alloy laded aerogel carbon electrode is described in U.S. Pat. No. 5,366,828, issued to ,Ralph C. Struthers and entitled, "Metal Alloy Laded Carbon Aerogel Hydrogen Hydride Battery."

Alex Muller and Georg Bednorz of the IBM Zurich Research Laboratory during January of 1986 made a ceramic compound of lanthanum, barium, copper and oxygen that superconducts at a critical temperature of 30 degrees kelvin. Paul Ching-Wu Chu and his research group at the University of Houston during February of 1987 made a ceramic 1-2-3 compound of yttrium, barium, copper and oxygen that superconductor at a critical temperature of 98 degrees kelvin, bring superconductivity into the liquid nitrogen range.

AT&T Bell Labs research group in 1988 made a ceramic compound of potassium, barium, bismuth and oxygen that superconducts at a critical temperature of 125 degrees kelvin, the first of the new superconducting oxides to work without copper.

The highest critical temperature of all superconductors ( at this writing) was 500 degrees kelvin observed by Ahmel Erbil, a Georgia Tech physicist, working with altered 1-2-3 ceramic compounds.

OBJECTS AND FEATURES OF THE INVENTION

An object of my invention is to provide a novel fuel cell structure including oxygenated perovskite ceramic superconducting aerogel anode and cathode parts with flat, spaced apart anode and cathode surfaces, and that become superconducting at their critical temperature and such that electrons move through them without resistance; and, an electrolyte-filled micro porous dielectric ceramic alcogel separator part that extends between the anode and cathode surfaces and through which ions move from the anode part to the cathode part.

Another object and feature of my invention to provide a fuel cell of the character referred to wherein a perfluorinated cation exchange membrane can be used as the separator, Dupont's, "NAFION" perfluorinated cation membrane can be used as the separator.

The foregoing and other objects and features of my invention will be apparent and will be fully understood from the following detailed description of typical, preferred embodiments of my invention throughout which description reference is made to the accompanying drawings.

DESCRIPTION OF THE DRAWINGS

FIG. 2 is a flow diagram illustrating the steps of forming the fuel cell catalytic perovskite ceramic superconductor aerogel electrodes; and, FIG. 3 is a flow diagram illustrating the steps of forming the fuel cell electrolyte-filled micro porous dielectric ceramic aerogel separators.

DETAILED DESCRIPTION OF THE INVENTION

Figure 1:
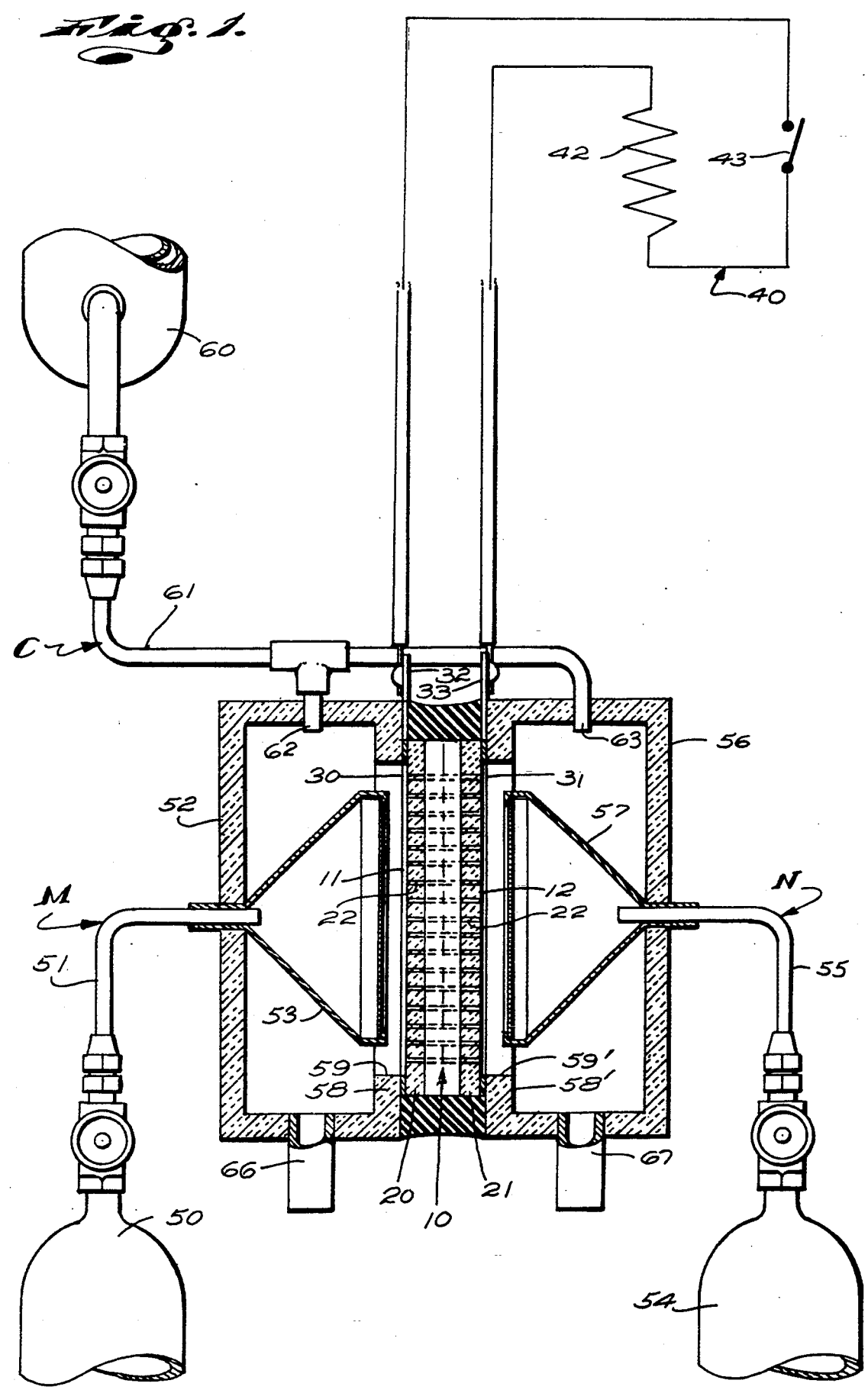
FIG. 1 is a cross-section view of one preferred embodiment of my new fuel cell.

Referring to FIG. 1 of the drawings, the fuel cell is built upon or about flat, plate-like anode and cathode electrodes 20 and 21 made of an oxygenated catalytic perovskite ceramic superconductor aerogel material and having flat, parallel, spaced apart, opposing anode and cathode surfaces 15 and 16. An electrolyte-filled micro porous ceramic aerogel separator 10 is positioned between the anode 20 and cathode 21 electrodes.

The anode electrode 20 is nearly an equivalent of the anode plate of a common fuel cell structure, but distinguishes therefrom in that it is superconductive. The cathode electrode 21 is nearly an equivalent of the cathode plate of a common fuel cell structure, but distinguishes therefrom in that it is superconductive. The electrolyte-filled micro porous ceramic aerogel separator 10 that is positioned between the anode and cathode electrodes and through which ions move from the anode electrode 20 to the cathode electrode 21, as a result of catalytic chemical reaction within the fuel cell, can be considered as establishing the internal circuit of the fuel cell.

The fuel cell has terminal structures 30 and 31 about the perimeters of the surfaces 15 and 16 of the electrode parts to facilitate connecting the electrodes to a related external electric circuit 40.

The circuit 40 has conductor lines at its opposite ends that are connected with terminal tabs 32 and 33 on the terminal 30 and 31.

For the purpose of this disclosure, a suitable electrical device, indicated by the resistance 42, is connected in the circuit 40 and a switch 43 is connected in the circuit 40 to selectively open and close the circuit and to put the fuel cell into and out of operation.

In addiction the foregoing, other support systems and/or means must be provided to establish and maintain operation of the fuel cell. For example, fuel and oxidant supply and delivery means M and N must be provided to supply the superconducting anode 20 and superconducting cathode 21 with an appropriate fuel and an appropriate oxidant.

In the preferred carrying out of my invention the fuel gas for the fuel cell is stored in a compressed gas cylinder 50, and is conducted from the cylinder 50 through a line 51 into a suitable housing structure where it is distributed across an outer surface 15' of the superconducting anode 20 by a suitable fuel distributor 53. The oxidant gas is stored in a compressed gas cylinder 54 and is conducted from the cylinder 54 through a line 55 into a suitable housing structure where it is distributed across an outer surface 16' of the superconducting cathode 21 by a suitable oxidant distributor 57.

The housing structure referred to above is shown as including two simple box-like sections or units 52 and 56 positioned adjacent the anode and cathode surfaces 15' and 16' of the anode 20 and cathode 21. The box-like units 52 and 56 have thermally insulated walls. The units 52 and 56 have flat, opposing, inside walls 58 and 58' with substantially centrally positioned openings 59 and 59'. The openings 59 and 59' are slightly smaller in dimension than the anode 20 and cathode 21. The anode 20 and cathode 21 are positioned between the walls 58 and 58' to overly the openings 59 and 59' and with there outer perimeter portions in secure clamped and sealed engagement between the walls.

The fuel and oxidant distributors 53 and 57 are shown as funnel or bell-like parts positioned within their related housing units 52 and 56. The distributors are connected with their related lines 51 and 55 and have (fuel and oxidant) gas distributing plates or screens that occur in close proximity to and extend across their related anode electrode 20 and cathode electrode 21.

The housing units and the distributors are preferably made of dielectric materials and/or are otherwise suitably electrically isolated from related parts of the fuel cell as required.

The terminal tabs 32 and 33 extend outward from the electrodes between the box-like housing units and a space that occurs between the housing units and about the anode, spacer and cathode assembly is filled with a suitable sealant.

In addition to the foregoing, my new fuel cell includes refrigeration means C that functions to cool the anode and cathode electrodes to their superconducting state. In the embodiment of my invention illustrated the means C includes a liquefied gas container 60 (such as Dewar Flask) containing a supply of liquefied refrigerant such as nitrogen. The liquefied refrigerant is conducted from the container 60 through a primary line 61 and thence through branch lines 62 and 63 to refrigerant inlet openings in housing units 52 and 56. The refrigerant flows into the units 52 and 56 where it cools the whole of the units and all that occurs within and between the units, including the anode and cathode electrodes. The housing units 52 and 56 have refrigerant outlet openings that connect with lines 66 and 67 of a suitable waste and/or refrigerant recovery system (not shown) and that allow for maintaining an appropriate flow of refrigerant into, through and from the housing units.

In practice, the form and construction of the fuel and oxidant supply means and the refrigeration means can be varied widely to better and/or more effectively attain the desired distribution of fuel, oxidant and refrigerant in the fuel cell structure.

The fuel cell catalytic perovskite ceramic superconductor anode and cathode electrodes are produced by the process steps set forth in FIG. 2 of the drawings and described below.

Process Step A:

Precipitating colloidal perovskite ceramic superconductor substances in a liquid as a gel having a stoichiometic formula of metal oxides and/or metal salts (i.e. Perovskite ceramic superconductor formulas $YBa_2Cu_3O_x$, $KBa_2Bi_3O_x$, $Bi_2Sr_2CuO_x$, $La_{2-y}Sr_yCuO_x$, $Bi_{1.6}Pb_{0.4}Sr_2Ca_2(Cu_{1-y}Ti_y)$, $Bi_{0.7}Pb_{0.3}SrCaCu_{1.8}O_x$, $Bi_2Sr_2CaCu_2O_x$, $Bi_{2.2}Sr_{1.8}Cu_{1-y}O_x$, $Sm_{1-y}Ba_2Cu_{3+y}O_x$, $(BiPb)_2Sr_2Ca_2Cu_3O_x$, $(BiPb)_2Ca_2Cu_3O_x$, $Bi_{2.3}Sr_{1.8}Cu_{1-y}Fe_yO_x$ and etc.) by utilizing a sol-gel process of either acid or base catalyzed hydrolysis and polycondensation reactions in alcohol to yield alcosols. The combined substances are mixed and poured into molds.

The process step set forth above establishes an alcosol suitable for making a perovskite ceramic superconductor the formula of which is $A_mB_nC_oD_x$; wherein m is between 0.1 and 3, where n is between 0.1 and 3, where o is between 0.1 and 3, where x is between 6 and 8, where A elements are selected from Groups Ia, IIIa and IIIb, where B elements are selected from Group IIa, IVa, and Va, where C elements are selected from Groups IVb, Vb, VIb, VIIb, VIII, Ib and IIb , and where D elements are selected from Groups VIa and VIIa of the Periodic Chart of The Elements.

Process Step B:

The combined substances gel in about 2–4 hours to form alcogel, which gel is let to aged for 36 hours under alcohol. The molded or alcogel parts are then, removed from their molds.

Process Step C:

The molded alcogel parts are next placed in a pressure-heat-cool vessel (not shown) that is filled with alcohol to maintain the alcogel structure fully stable. The vessel and gel are next sealed and cooled to about 18 degrees C; and the vessel is filled and pressurized with liquid $CO_2$ to approximate 800 psi. Next, repetitive purging of the vessel with liquid $CO_2$ displaces all the alcohol within the gel and converts the molded alcogel parts to carbon dioxide gel parts.

Process Step D:

The carbon dioxide gel parts are then supercritical dried in the vessel to convert them to aerogel parts by raising the temperature to 32–40 degrees C, while maintaining the pressure at about 1200 psi for a period of 30–60 minutes and then slowly reducing the pressure in the vessel and venting the $CO_2$ to atmosphere.

Process Step E:

The dried aerogel parts are placed atop a thick bed of zircomia sand on a kiln deck plate in a vented (air) kiln; and, for about one hour, whereupon the temperature is progressively increased to about 205 degrees C. The parts are soak at that elevated temperature for about one hour, whereupon the temperature in the kiln is progessively increased to 900–950 degrees C. The parts are let to soak and to fire at that temperature for 9–12 hours. Next, the kiln is slowly cooled to about 38 degrees C, and the resulting micro-porous fired aerogel ceramic parts are removed from the kiln.

Process Step F:

The fired aerogel ceramic parts are next placed in an oven or kiln annealed at 950 degrees C in an oxygen atmosphere to force oxygen atoms into the lattice chain 19 structure thereof, thereby increasing the temperature at which the parts become superconducting. The "$x$" subscript values for oxygen content typical ranges from 6 to 8. The annealed ceramic is cooled slowly over approximately 10 hours.

Process Step G:

The oxygen annealed superconductor ceramic parts, which are the anode and cathode electrodes of my new fuel cell, are cooled to below their critical superconducting temperature in a bath of liquid nitrogen and tested for superconductivity as follows:

a. Electrical resistance
b. Meissner effect
c. Current Density
d. Josephson effect The fuel cell electrolyte-filled micro porous dielectric ceramic aerogel separator is produced in accordance with the process diagrammatically shown in FIG. 3 of the drawings, and described below.

Process Step H:

Precipitating colloidal ceramic substances in a liquid as a gel having a stoichiometic formula proportions as ceramic oxides (i.e. Formulas $BaTiO_3$, $Al_2O_3.2SiO_2.2H_2O$, $MgO.ZrO_2$, $SiO_2,Al_2Si_2O_7.2H_2O$, $Na_2O.CaO.6SiO_2$, $xSiO_2.yB_2O_3$, $ZrO_2$ $Al_2O_3$, $3Al_2O_3.2SiO_2$, $CaTiO_3$, $PbTiO_3$, $LiTiO_3$, $MgTiO_3$ and etc.) by utilizing a sol-gel process of either acid or base catalyzed hydrolysis and polycondensation reactions in alcohol to yield alcosols. The combined substances are mixed and poured into a mold.

The process step set forth above establishes an alcosol suitable for making a micro-porous dielectric ceramic aerogel separator the formula of which is $xA_yO_z.xB_yO_z$; wherein x is between 1 and 6, where y is between 1 and 3, where z is between 1 and 3, where element O is oxygen, where A elements are selected from Groups IA, IIA, IVA and where B elements are selected from Groups IVB, IIIA of the Periodic Chart of The Elements.

Process Step I:

The combined substances gel in about 2–4 hours to form an alcogel, which is let to aged for about 36 hours under alcohol. The molded alcogel part is then removed from their mold.

Process Step J:

The molded alcogel part is next placed in a pressure-heat-cool vessel (not shown) that is filled with alcohol to maintain the alcogel structure fully stable. The vessel is then sealed and cooled to about 18 degrees C; and is filled and pressurized with liquid $CO_2$ to about 800 psi. Next, repetitive purging of the vessel and parts with liquid $CO_2$ displaces all the alcohol with liquid $CO_2$ and converts the alcogel part to a carbon dioxide gel part.

Process Step K:

The carbon dioxide gel part is then supercritical dried in the vessel to convert it into an aerogel part by raising the temperature to 32–40 degrees C, while maintaining the pressure at about 1200 psi for a period of 30–60 minutes and then slowly reducing the pressure in the vessel and venting the $CO_2$ to atmosphere.

Process Step L:

The dried aerogel part is placed atop a thick bed of zircomia sand on a kiln deck plate in a vented (air) kiln; and, for one hour during which the temperature is progressively increased to about 205 degrees C. The part is soak at that elevated temperature for about one hour. The temperature is progessively increased in the kiln to 900–950 degrees C and the part is let to soak and to fire at that temperature for 9–12 hours. Next, the kiln is slowly cooled to about 38 degrees C, whereupon the resulting fired aerogel ceramic part is removed.

Process Step M:

The micro porous ceramic aerogel separator part is next placed in a pressure-heat-cool vessel (not shown) and filled with a liquid electrolyte so as to maintain the aerogel structures stable. The vessel is then sealed and temperature of the liquid electrolyte is brought to the critical temperature, where said electrolyte is transformed into a gas. Next, repetitive purging of the vessel and the part with the electrolyte is utilized to displace all the air with said electrolyte (i.e. fluosulfonic acid $HSO_3F$). When the temperature is decreased below its critical temperature the aerogel structure is left filled with the liquid electrolyte and a micro porous electrolyte-filled dielectric ceramic aerogel separator is produced.

The fuel cell, using a micro porous electrolyte-filled dielectric ceramic aerogel separator between ceramic superconductor aerogel electrodes (with respect to electrolyte management) operates as a starved electrolyte system, i.e., the amount of electrolyte present does not completely saturate the porous components. Consequently, the electrolyte distribution is affected both by the transport phenomena introduced by the presence of a current flowing in the cell and by the competition of the porous components for the available electrolyte.

The above separator of my new fuel cell may be replaced by a perfluorinated cation exchange membrane separator without departing from the broader aspects and spirit of the invention. One available and suitable perfluorinated cation exchange membrane separator is produced by Dupont under the trademark "NAFION".

OPERATION OF THE FUEL CELL SYSTEM

In operation of my new fuel cell refrigerant from the refrigerant supply means C is utilized to cool the anode and cathode electrodes to their superconducting state. The fuel from the fuel supply means M reacts at the catalytic anode electrode 20 and results in the generating of ions and free electrons that move through that electrode with no resistance. The ions from the anode electrode 20 move through the electrolyte Separator 10 to the cathode electrode 21. Oxidant from the oxidant means system N oxidizes the catalytic cathode electrode 21 of the fuel cell. In the cathode reaction free electrons that were given up by the anode electrode 20 move through the external circuit 40 and collect in the catalytic cathode electrode 21. The electrons conduct with no resistance in cathode electrode 21 and react with the oxidant and ions in the cathode electrode 21. The pathway for the directional flow of the ions through the electrolyte separator 10 of the fuel cell viewed as the internal circuit of the cell and the pathway for the flow of electrons is viewed as the external circuit of that cell.

Having described only one typical preferred structural embodiment of my invention and the functional aspects and/or mode of operation thereof, I do not wish to be limited to the specific details herein set forth but wish to reserve to myself any modifications and/or variations that might to those skilled in the art and which fall within the scope of the following claims.

Having described my invention, I claim:

1. An electrochemical fuel cell system comprising spaced apart microporous perovskite ceramic aerogel anode and cathode electrodes; an electrolyte-filled micro porous dielectric ceramic aerogel separator in contact engagement with and between the electrodes; a fluid fuel supply means delivering fuel to the anode electrode; a fluid oxidant supply means delivering oxidant to the cathode electrode; an external electric circuit extending between and connected with the electrodes; and, refrigeration means cooling the electrodes to below a temperature at which the resistance to electric flow therein diminishes.

2. The electrochemical fuel cell set forth in claim 1 wherein; the electrodes have inward disposed opposing inner surfaces engaged with the separator and outwardly disposed outer surfaces; a first housing unit overlies the outer surfaces of the anode electrode and into which fuel is delivered, a second housing unit overlies the outer surface of the cathode electrode and into which oxidant is delivered.

3. The electrochemical fuel cell set forth in claim 1 wherein; the electrodes have inwardly disposed inner surfaces engaging the separator and outwardly disposed outer surface; fuel distributor means overlies the outer surface of the anode electrode and receives fuel from the fuel supply means and distributes it to the outer surface of the anode electrode; and housing units overlying the outer surfaces of the electrode and the fuel and oxidant distributor means and into and through which fluid refrigerating means is conducted to cool the electrodes.

4. The electrochemical fuel cell set forth in claim 1 wherein; the electrodes have inwardly disposed inner surfaces engaging the separator and outwardly disposed outer surface; oxidant distributor means overlies the outer surface of the cathode electrode and receives oxidant from the oxidant supply means and distributes it to the outer surface of the cathode electrode; and housing units overlying the outer surfaces of the electrode and the fuel and oxidant distributor means and into and through which fluid refrigerating means is conducted to cool the electrodes.

5. The electrochemical fuel cell set forth in claim 3 wherein; the electrodes and separator have perimeter portions in clamped engagement with each other and between the housing units.

6. The electrochemical fuel cell set forth in claim 4 wherein; the electrodes have electric conductive terminal means about the perimeter portions of their inner surfaces thereof and to which the external circuit is connected.

7. The electrochemical fuel cell set forth in claim 1 wherein; the chemical formula of micro-porous perovskite ceramic aerogel is $A_m B_n C_o D_x$; wherein m is between 0.1 and 3, where n is between 0.1 and 3, where o is between 0.1 and 3, where x is between 6 and 8, where A elements are selected from Groups Ia, IIIa and IIIb, where B elements are selected from Group IIa, IVa, and Va, where C elements are selected from Groups IVb, Vb, VIb, VIIb, VIII, Ib and IIb, and where D elements are selected from Groups VIa and VIIa of the Periodic Chart of The Elements.

8. The electrochemical fuel cell set forth in claim 1 wherein; the chemical formula of micro porous dielectric ceramic aerogel is $xA_y O_z \cdot xB_y O_z$; wherein x is between 1 and 6, where y is between 1 and 3, where z is between 1 and 3, where element O is oxygen, where A elements are selected from Groups IA, IIA, IVA and where B elements are selected from Groups IVB, IIIA of the Periodic Chart of The Elements.

9. The electrochemical fuel cell set forth in claim 1 wherein; the chemical formula of micro-porous perovskite ceramic aerogel is $A_m B_n C_o D_x$; wherein m is between 0.1 and 3, where n is between 0.1 and 3, where o is between 0.1 and 3, where x is between 6 and 8, where A elements are selected from Groups Ia, IIIa and IIIb, where B elements are selected from Group IIa, IVa, and Va, where C elements are selected from Groups IVb, Vb, VIb, VIIb, VIII, Ib and IIb, and where D elements are selected from Groups VIa and VIIa of the Periodic Chart of The Elements; and the chemical formula of micro porous dielectric ceramic aerogel is $xA_y O_z \cdot xB_y O_z$; wherein x is between 1 and 6, where y is between 1 and 3, where z is between 1 and 3, where element O is oxygen, where A elements are selected from Groups IA, IIA, IVA and where B elements are selected from Groups IVB, IIIA of the Periodic Chart of The Elements.

* * * * *